United States Patent [19]

Jurisch

[11] 3,953,968
[45] May 4, 1976

[54] APPARATUS AND METHOD FOR GOVERNING SPEED AND ACCELERATION OF A GAS TURBINE SYSTEM

[75] Inventor: Wilhelm Jurisch, Nellingen, Germany

[73] Assignee: Motoren-und Turbinen-Union Munchen GmbH, Germany

[22] Filed: Aug. 31, 1973

[21] Appl. No.: 393,274

[30] Foreign Application Priority Data
Aug. 31, 1972 Germany............................ 2242901

[52] U.S. Cl............................................ 60/39.28 R
[51] Int. Cl.²........................................... F02C 9/10
[58] Field of Search............ 60/39.28 R, 39.03, 243; 415/10, 17

[56] References Cited
UNITED STATES PATENTS

| | | | |
|---|---|---|---|
| 2,941,602 | 6/1960 | Coar | 60/39.28 R |
| 2,949,957 | 8/1960 | Eastman | 60/39.28 R |
| 3,021,674 | 2/1962 | Zeisloft | 60/39.28 R |
| 3,025,670 | 3/1962 | Russ | 60/39.28 R |
| 3,064,421 | 11/1962 | Jurisch | 60/39.28 R |
| 3,092,966 | 6/1963 | Kuzmitz | 60/39.28 R |
| 3,111,809 | 11/1963 | Bierwirth | 60/39.28 R |
| 3,498,058 | 3/1970 | Greune | 60/39.28 R |
| 3,587,231 | 6/1971 | Fisher | 60/39.28 R |

*Primary Examiner*—Clarence R. Gordon
*Attorney, Agent, or Firm*—Craig & Antonelli

[57] ABSTRACT

Apparatus and method for governing speed and acceleration of a gas turbine system which includes a trimming unit responsive to the speed of a common shaft connecting a combustion air compressor and a gas turbine, which trimming unit varies the fuel flow to the combustion chamber. The setting of the fuel flow to a new speed is by way of a pressure reducer and actuator piston movable in response to changes in the compressor outlet pressure. A blocking mechanism is provided for blocking out the trimming means during acceleration and deceleration conditions. The actuator piston movable with the compressor end pressure is attached at one end of a pivotal bar which has the other end pivotally connected to a control valve sleeve on a fuel supply valve, while the trimming unit operates to control the position of a pivot intermediate the ends of the control bar in response to a speed governor which acts on a control valve piston slidable within the control sleeve.

21 Claims, 3 Drawing Figures

APPARATUS AND METHOD FOR GOVERNING SPEED AND ACCELERATION OF A GAS TURBINE SYSTEM

BACKGROUND AND SUMMARY OF THE INVENTION

This invention relates to an apparatus and a method for governing the speed and acceleration of a gas turbine engine system of the type having a combustion air compressor and a gas turbine on a common shaft and a combustion chamber, where said governing apparatus has a speed governor for varying the fuel flow as a function of the speed of said shaft.

The present invention contemplates providing means for speed governing which cooperates with means for limiting acceleration and deceleration and employs the ultimate compressor pressure as an index value to control the fuel or injection flow, and simple automatic trimming means which permit optimum speed adjustments to be made at all possible operating conditions also in the presence of efficiency fluctuations at high altitudes and when use is made of different fuel grades.

This apparatus is equally well suited for maintaining safe service conditions when with vehicular or stationary gas turbine engines employing heat exchangers the transition is made from operation with cold heat exchanger to operation with a hot one. This compensation for temperature changes of the heat exchanger is done indirectly by regulating the fuel flow as a function of the speed of rotation of the common shaft and as a function of the pressure of the compressor.

These and further objects, features and advantages of the present invention will become more obvious from the following description when taken in connection with the accompanying drawings, which show, for purposes of illustration only, a single embodiment in accordance with the present invention.

BRIEF DESCRIPTION OF THE DRAWINGS

FIG. 1A shows a detail of FIG. 1; and

DETAILED DESCRIPTION OF THE DRAWINGS

Figure 1:
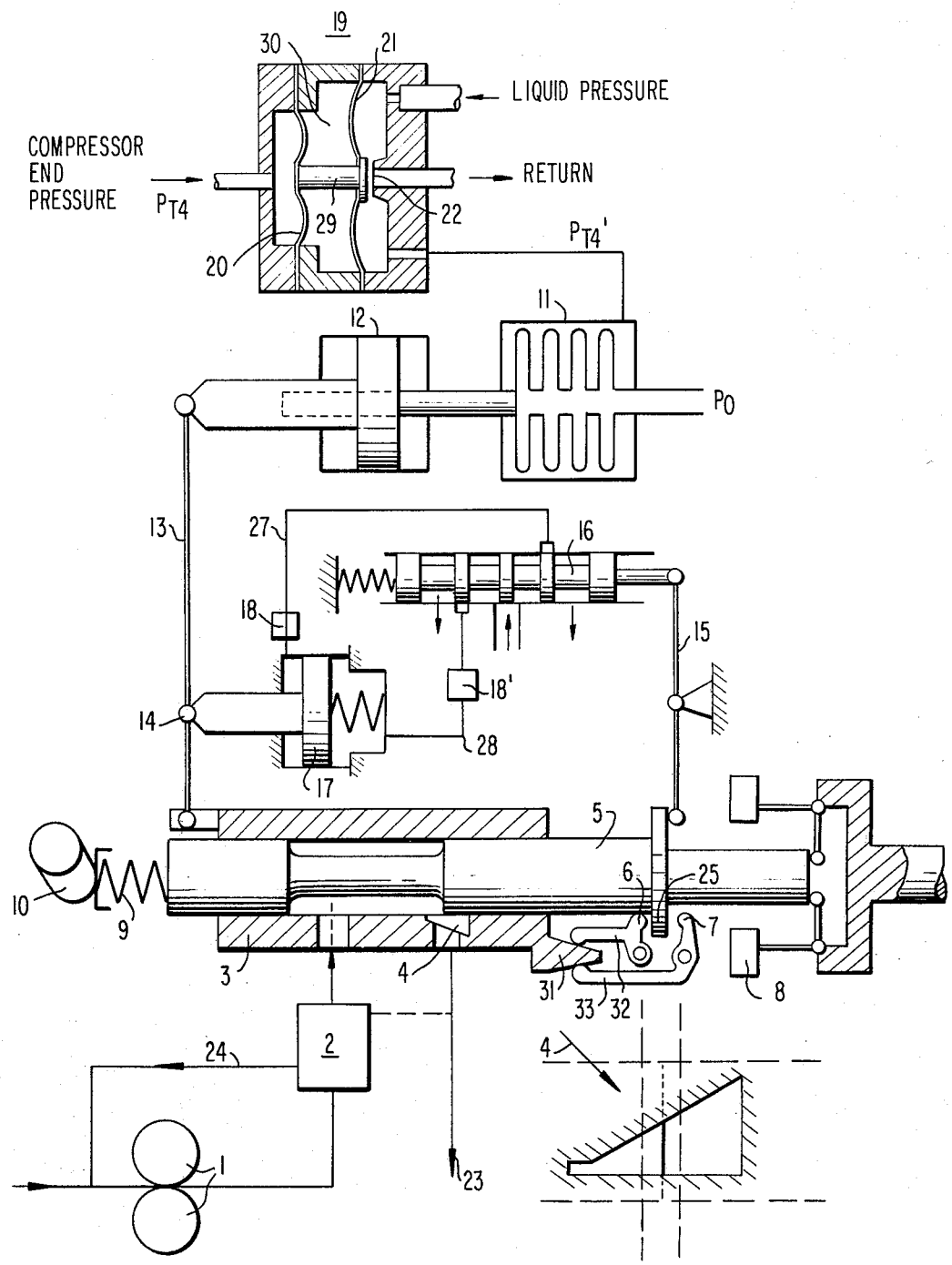
FIG. 1 is a schematic representation of a speed and acceleration governing system for a gas turbine engine constructed in accordance with a preferred embodiment of the present invention.

With reference to FIG. 1, the fuel coming from a tank system is discharged by an injection pump 1 through a differential pressure valve 2 to a fuel control sleeve 3. At a control port 4 within sleeve 3, which is limited by an edge of an axially displaceable control piston 5, the pressure difference is maintained at a constant level by the pump 1 and valve 2. The unused, noninjected portion of the pump discharge flow is returned to the pump inlet through the differential pressure valve 2 and a line 24. Fuel does not flow from 23 to 24. The dash line between line 23 and valve 2 is a line for a pressure feeler or sensor disposed in valve 2 for measuring the fuel pressure in line 23. The free control area or discharge cross-sectional area of port 4 thus becomes a measure of the fuel flow admitted to an injection nozzle line 23.

For metering the fuel during acceleration, the control sleeve 3 is axially displaced as a linear function of the final compressor pressure $P_{T_4}$ (see following more detailed description of 11, 12, 13 interconnecting sleeve 3 with function of compressor outlet pressure or ultimate pressure $P_{T_4}$).

The contour of the metering area (control port 4) is designed for acceleration and deceleration below the compressor surge line, or above the combustion chamber flameout line for operation near the ground and by limiting maximum relative movement of sleeve 3 and piston 5 with appropriate stops that are not shown. FIG. 1A is an enlarged view of opening 4 taken in a radial direction from within sleeve 3.

Let the fuel or injection flow B of an aircraft engine be plotted on the ordinate of a diagram (FIG. 2) as ranging from 0 to 2800 kg/h and the pressure difference of the combustion air compressor $0.5\ P_{T_4}-P_o$ on the right-hand abscissa from 0 to 15 kg/cm$^2$, and the fuel flow will at all flight conditions from 0 to 22-km altitude and at various shaft and airspeeds fall favorable between an upper and a lower limitation when using the method and apparatus of the present invention. The upper limitation is posed by a curve of the maximum allowable fuel flow; and the lower limitation, by a curve of the minimum allowable. Each of these two curves originates in approximately the area of the coordinate intersection and from there runs to the upper right-hand side, exhibiting a moderate droop at first which lessens as the curve continues. The two curves diverge along their course. For example, the 9.2 kg/cm$^2$//2550 kg/h point is a point of the upper curve. Extending in the same fashion between the two curves is a curve for the stationary state (stat. %).

Figure 2:
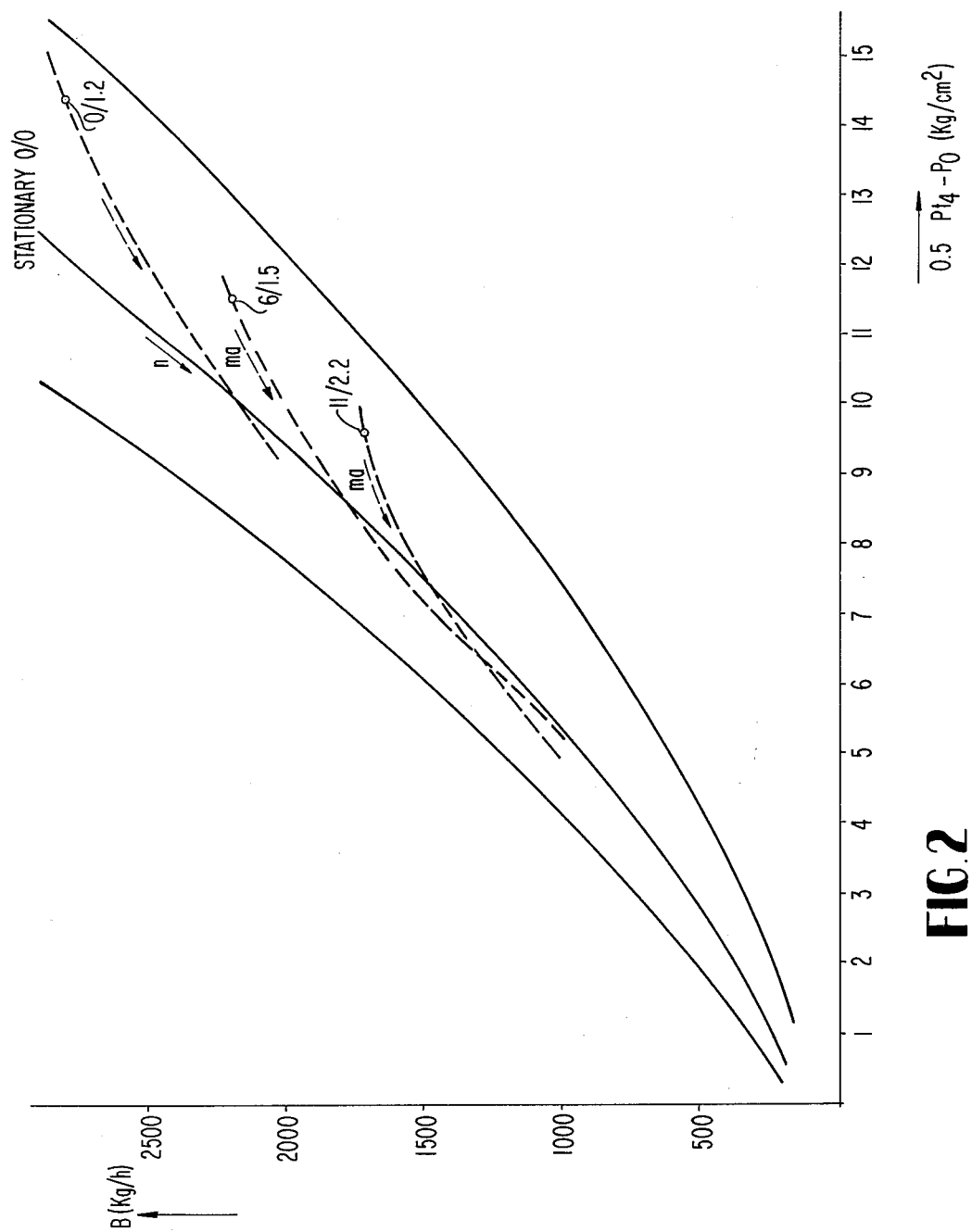
FIG. 2 is a graph depicting fuel flow as a function of ultimate compressor pressure resulting from utilization of a governing system constructed in accordance with the present invention.

The diagram of graph of FIg. 2 also contains three curves shown in dashed lines. These curves represent the fuel consumption (B) above the reduced pressure difference referred to, and specifically for three different flight altitudes and flight mach numbers (Ma) — see 0/1.2 (0 km/1.2 Ma), 6/1.5 and 11/2.2 — and in each case at a maximal rotational engine speed (approximately 19,500 revolutations per minute). The dashed Ma arrows indicate decreasing flight mach numbers. The n arrow signifies a decreasing rotational engine speed. 0/0 means 0 km flight altitude/Ma = 0(airplane standing on ground; engine running).

A collar 25 is fixedly arranged on a control valve piston 5 between two movable axial stops 6 and 7 or coaxial stops not shown here (taking the places of the shown stops 6 and 7) at axial distances from both. Then when the operating conditions change, perhaps in terms of flight attitude and/or air temperature and/or fuel grade and/or fuel temperature and cause an axial displacement of collar 25 from the central position as result of a change in the speed of the shaft and, thus, in the position of the flyweights 8, an actuating lever 15 causes a valve 16 to leave its axially central or closed position to adjust the control sleeve 3 by means of an actuator (piston) 17 through a pivot 14 of a connecting lever 13. As the control sleeve moves towards the new position, the control piston 5 and the collar 25 thereon simultaneously move towards their central position until the valve 16 is back in its closed position and the trimming process is completed. This trimming process thus causes 1. accurate governing of the specified speed without irregularity as set by means of a selector cam 10, and 2. interrelationship, variable with operating conditions, of the position of the fuel control sleeve 3 to the position of an actuator piston 12 operated by the ultimate compressor pressure.

Before acceleration or deceleraton is initiated, the collar 25 is in its governing position between stops (6 and 7). When the selector cam 10 is operated, it causes the control valve 5 to move until the collar 25 hits the stop (6 or 7) and thus causes a sudden change in the injection flow to trigger a change in speed. After the initial movement of selector cam 10, the change in speed along the limitaton is controlled solely by the course of the control sleeve 3 as a function of the ultimate compressor pressure (until governor 8 and spring 9 permit or cause return of collar 25 to a central position between the stops when the trimming apparatus 15, 16, 17 becomes operative to also control sleeve 3 by varying the position of pivot point 14 of connecting lever or bar 13 extending from actuator 12 to the sleeve 3). That is, for the duration of this transition to the new selected speed the control valve 5 remains against its stop (6 or 7), in which position the trimming means is blocked by the valve 16 to prevent over-undercontrol whle the change in speed is being made. When the selected speed has come to bear, the action of the flyweights 8 against the force of spring 9, causes the control piston 5 to break away from its position against the stop and the valve 16 follows suit to reactivate the trimming means. Spring 9 and flyweights 8 are designed to assure transition to the new speed before piston 5 breaks away and activates 16. To prevent hunting, the adjusting rate of the actuator (17) is limited by restrictors 18 and 18' in the control lines 27 and 28. The arrows leading to and from valve 16 represent a fluid pressure input and pressure vents respectively. Since means of conventional construction can be used to supply valve 16 with appropriate pressure supplies, more details thereof are not included herein. For example, a pump or line leading to another hydraulic pressure source of the engine could be used to power actuator 17 by way of valve 16. The spring at the left end of valve 16 assures that actuating lever 15 is always pressed against and therefore movable with collar 25 and piston 5. Although piston 5 is returned to a central position with 15, 16, 17 effecting a trimming of the fuel flow for all set speeds, the fuel flow is different for each speed due to the movement of sleeve 3 by way of actuator 12 and secondarily by trimming device 15, 16, 17.

Numeral 19 indicates a pressure converter. It can be used for governing engines of very high ultimate compressor pressure to produce, depending on design and adjustment, a proportional, low working pressure to act on governor pressure bellows 11 (pressure bellows for high pressures are small in diameter or consist of heavy plate for relatively short travel with a linear characteristic). $P_o$ depicts compressor inlet pressure. See FIG. 2 for the characteristic relationship between $P_{T_4}$ and $P_o$ for governing fuel flow in accordance with the present invention.

Pressure converter 19 provides, apart from the proportional reduction of pressure, a means for converting the air pressure of the compressor $P_T$ into a proportionally great liquid pressure $P_{T_4}$. Utilization of liquid pressure $P_{T_4}$ will in all applications eliminate sealing problems between the actuating pressures in a bellows chamber 11 and the hydraulic liquid of power booster 12. This booster 12 is pivotally connected at one end to connecting lever 13 for controlling sleeve 3 independently of the position of piston 5.

The pressure converter 19 contains two diaphragms 20 and 21 of different size to suit the pressure reduction sought, and an evacuated intermediate chamber 30. The two diaphragms 20 and 21 are centrally interconnected by means of a rod 29 which on the side of the large diaphragm 21 cooperates with a port 22 to control a liquid pressure which acts on the diaphragm 21 and balances the compressive force from the diaphragm 20.

The limit stops 6 and 7 are axially adjustable in that the levers 32 and 33 are pivotally mounted about axes as a function of the axial displacement of the control sleeve 3— note the levers 32 and 33 on a fixedly mounted wedge 31 on the control sleeve.

Although the illustrated perferred embodiment of the invention is fluid-mechanical, it is also contemplated by the present invention to use electrical electronic elements for effecting a similar governing of the fuel supply.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for governing the speed and acceleration of a gas turbine engine system of the type having a combustion air compressor and a gas turbine on a common shaft and a combustion chamber; said apparatus comprising:
    fuel supply valve means for directly controlling the amount of fuel supplied to said engine,
    first valve control means for varying the opening of said fuel valve means as a function of the speed of said common shaft,
    and second valve control means for varying the opening of said fuel valve means as a function of an engine operating parameter index value other than the speed of said common shaft which changes during a change in the adjustment of the desired nominal speed of the engine,
    wherein said fuel valve means includes a movable fuel control sleeve, wherein said second valve control means includes linkage means connected to and movable with said fuel control sleeve, wherein said first valve control means includes means for varying the position of said linkage means with respect to other portions of said second valve control means,
    wherein said second valve control means includes an actuator piston which is movable in response to changes in said parameter index value, wherein said actuator piston is pivotally connected to one end of a bar, wherein the other end of said bar is pivotably connected to said control sleeve, wherein said first valve control means includes a movable member which is pivotably connected to said bar at a position intermediate the ends of said bar,
    further comprising blocking means for blocking the operation of said first valve control means during transition between selected nominal engine speeds, wherein said fuel valve means further includes a fuel control piston which is surrounded by said fuel control sleeve such that the amount of fuel flow is dependent on the axial displacement of said fuel control piston and sleeve with respect to one another, and wherein said blocking means includes lever means interconnecting said fuel control piston and a pressure valve of said first valve control means such that movement of said fuel control piston to a predetermined position corresponding to initiation of one of acceleration and deceleration effects blockage of said pressure valve.

2. Apparatus according to claim 1, wherein said lever means is movable with said fuel control piston and with a control piston of said pressure valve for continuously varying said pressure valve as a function of the position of said fuel control piston whenever said fuel control piston is away from positions corresponding to one of acceleration and deceleration, and wherein said fuel control piston is connected to a speed governor of said common shaft such that said fuel control piston moves in direct response to changes in speed of said common shaft.

3. Apparatus according to claim 2, wherein said operating parameter index value is the pressure of the combustion air compressor.

4. Apparatus according to claim 3, wherein said second valve control means includes pressure reducer means for applying a force on said actuator piston which is a function of the inlet and outlet pressure of said compressor.

5. Apparatus according to claim 1, wherein said operating parameter index value is the outlet pressure of the combustion air compressor.

6. Apparatus according to claim 1, wherein said fuel control piston is acted upon at one end by a control cam under the imposition of a spring and at the other end by a speed governor attached to said common shaft.

7. Apparatus for regulating the speed and acceleration of a gas turbine plant including, in sequence in the flow direction, a combustion air compressor, a combustion chamber, and a gas turbine seated on a common shaft with this compressor, this apparatus comprising:
a fuel feed slide valve made up of a control piston movable between two axial stops and a control bushing surrounding this piston,
a centrifugal governor responsive to the speed of said common shaft and axially effective on the control piston,
a counter spring having a tension which is variable by a speed selector lever and which engages said control piston,
means for the axial displacement of the control bushing when shifting the speed selector lever and when the control piston is in axial engagement with one of said axial stops, as a function of an operating characteristic of the gas turbine plant varied with the speed of revolution of the shaft, by way of a servo-piston engaging a lever, said lever being supported to be pivotable about an axle and being in engagement with the control bushing,
and a trimming device for the automatic displacement of the aforementioned axle and thus of the control bushing as a function of the axial displacement of the control piston; said trimming device including a further lever, a further slide valve, and a further servo-piston, wherein this further lever is pivotably mounted at a housing of the apparatus and engages the control piston and the slide of the further slide valve, and wherein the further servo-piston engages in the aforementioned axle at the first-mentioned lever and is hydraulically displaceable by the above-mentioned further lever by way of the further slide valve.

8. Apparatus according to claim 7, wherein, when the axial stops are disposed oppositely to the periphery of the control piston and when a collar of the piston extending between the axial stops is provided, the aforementioned further lever engages this collar.

9. Apparatus according to claim 7, wherein the axial stops are provided at the end of respectively one pivotable angle lever, a wedge fixedly mounted to the control bushing being engaged between the other ends of these levers.

10. Apparatus for governing the speed and acceleration of a gas turbine engine system of the type having a combustion air compressor and a gas turbine on a common shaft and a combustion chamber; said apparatus comprising:
fuel supply valve means for directly controlling the amount of fuel supplied to said engine in dependence on the displacement of respective first and second valve parts with respect to one another,
first control means for directly controlling the position of said first valve part in dependence on the speed of said common shaft and the position of a controllable selector member,
second control means for controlling the position of said second valve part as a function of an engine operating parameter index value other than the speed of said common shaft, said second control means including a mechanical linkage interconnecting said second valve part with a mechanism movable in response to change in said index value,
and trimming means for automatically moving a portion of said mechanical linkage to effect changes in the movement imparted to said second valve part by said second control means as a function of the displacement of the first valve part,
wherein said first control means includes a governor engageable with one end of said first part, and wherein said controllable selector member engages the other end of said first part by way of a resilient member.

11. Apparatus according to claim 10, wherein one of said first and second valve parts is a piston and the other of said first and second valve parts is a bushing which is in axially slidable surrounding relationship to said piston.

12. Apparatus according to claim 11, wherein said trimming means includes a trimming lever, a slide valve and a servopiston, wherein said trimming lever is pivotally mounted at a housing and is engaged with said piston and a slide of said slide valve, wherein said mechanical linkage includes a control lever which is pivotally mounted at an axle and is engaged with said bushing and another movable part of said second control means, and wherein the servopiston engages said axle for movement therewith and is displaceable by the trimming lever by way of the slide valve.

13. Apparatus according to claim 10, wherein said trimming means includes a trimming lever, a slide valve and a servopiston, wherein said trimming lever is pivotally mounted at a housing and is engaged with said first valve part and a slide of said slide valve, wherein said mechanical linkage includes a control lever which is pivotally mounted at an axle and is engaged with said second valve part and another movable part of said second control means, and wherein the servo-piston engages said axle for movement therewith and is displaceable by the trimming lever by way of the slide valve.

14. Apparatus according to claim 11, wherein said first part is said piston.

15. Apparatus according to claim 13, wherein said first part is said piston.

16. Apparatus according to claim 15, wherein said piston includes a collar disposed intermediate a pair of stop members, and wherein said trimming lever engages with said collar.

17. Apparatus according to claim 3, wherein said second valve control means includes means for reducing said outlet pressure of compressor and means for moving said actuator piston as a function of the difference ($0.5 P_{T_4} - P_o$) between the reduced outlet pressure of said compressor and the static pressure of the embient air.

18. Apparatus according to claim 7, wherein said second valve control means includes means for reducing said outlet pressure of compressor and means for moving said actuator piston as a function of difference ($0.5 P_{T_4} - P_o$) between the reduced outlet pressure of said compressore and the static pressure of the ambient air.

19. Apparatus according to claim 10, wherein said operating parameter index value is the outlet pressure of the combustion air compressor.

20. Apparatus according to claim 7, further comprising blocking means for blocking the operation of said first trimming device during transition between selected nominal engine speeds.

21. Apparatus according to claim 10, further comprising blocking means for blocking the operation of said trimming means means during transition between selected nominal engine speeds.

* * * * *